No. 718,829. PATENTED JAN. 20, 1903.
W. W. DOOLITTLE.
MOLDING MACHINERY.
APPLICATION FILED DEC. 7, 1900.
NO MODEL. 3 SHEETS—SHEET 1.
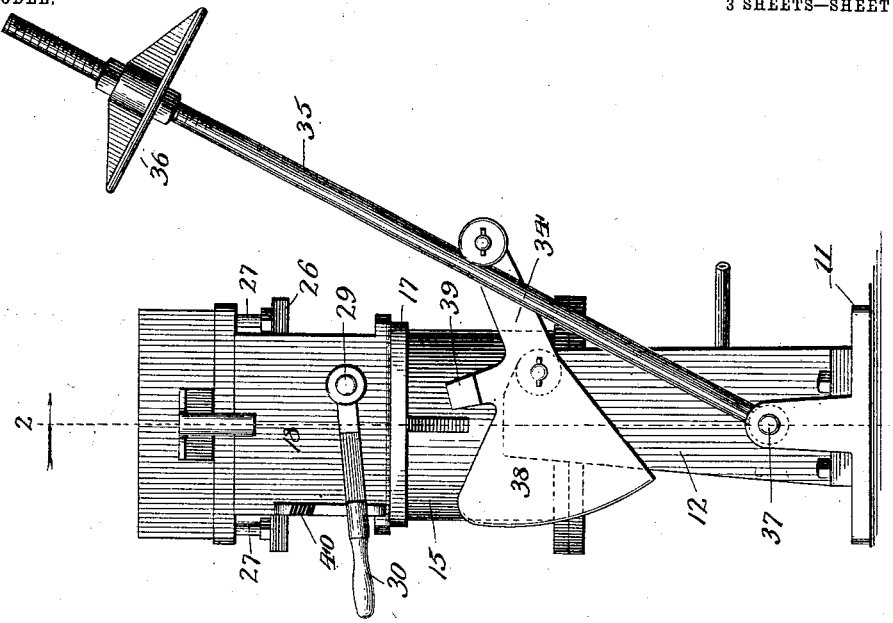
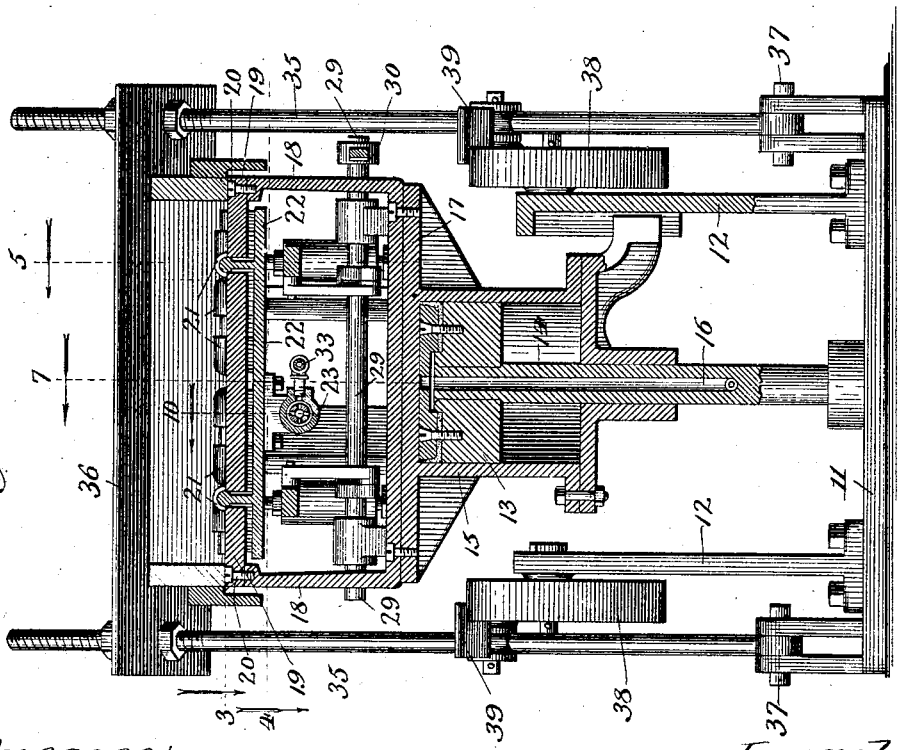
Witnesses:
Chas. E. Gaylord,
John Enders Jr.
Inventor:
William W. Doolittle
By Paul Synnestvedt
Atty.

No. 718,829. PATENTED JAN. 20, 1903.
W. W. DOOLITTLE.
MOLDING MACHINERY.
APPLICATION FILED DEC. 7, 1900.
NO MODEL. 3 SHEETS—SHEET 2.
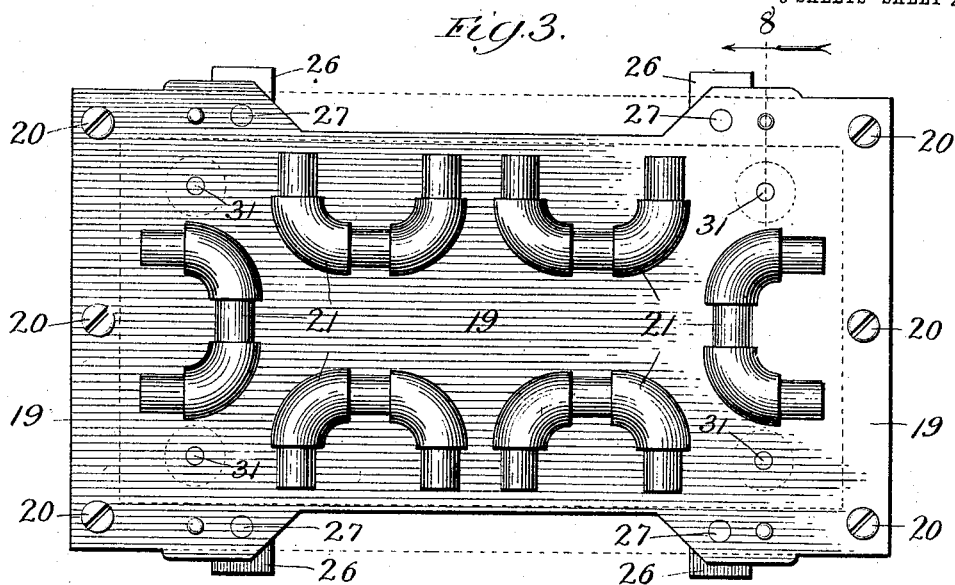
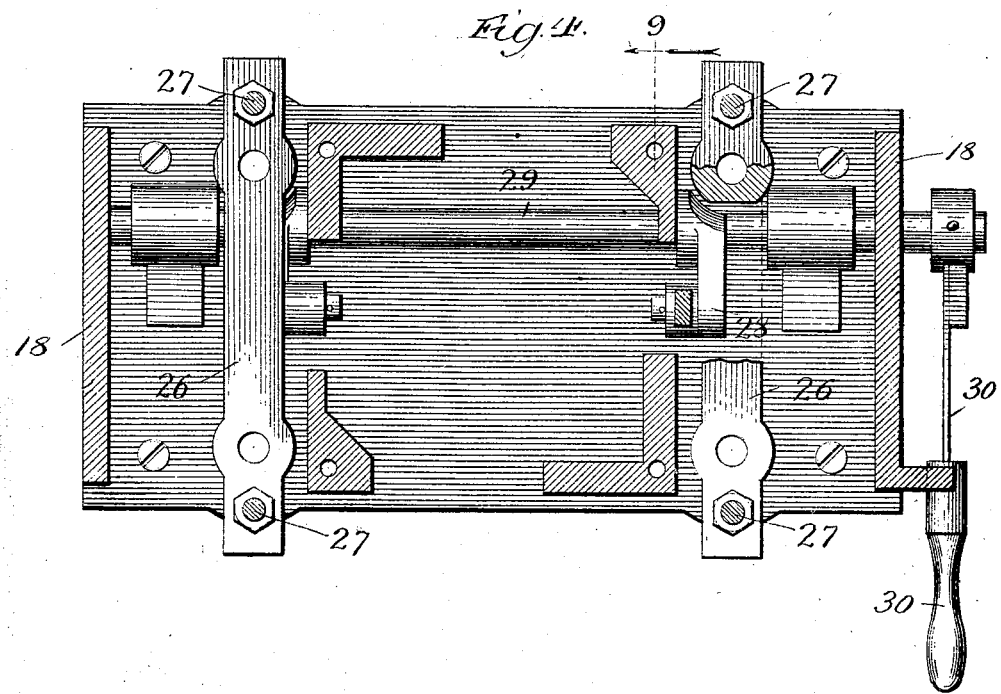
Witnesses:
Inventor:
William W. Doolittle
By Paul Synnestvedt
Atty.

No. 718,829.
PATENTED JAN. 20, 1903.
W. W. DOOLITTLE.
MOLDING MACHINERY.
APPLICATION FILED DEC. 7, 1900.
NO MODEL.
3 SHEETS—SHEET 3.
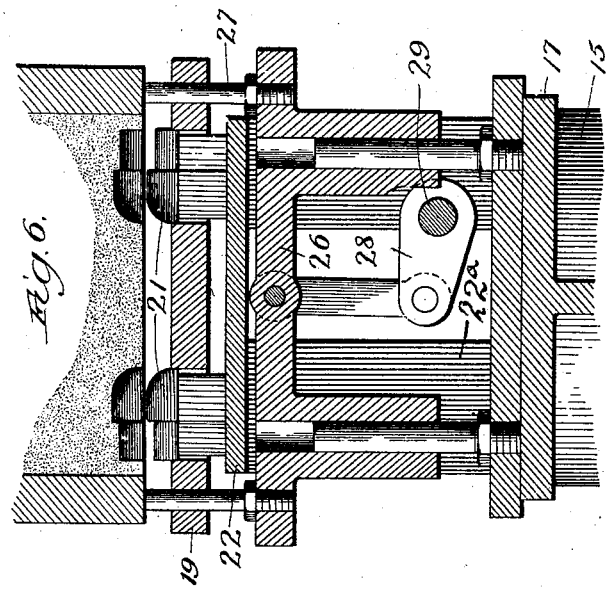
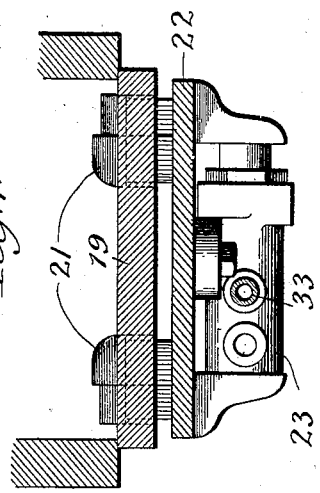
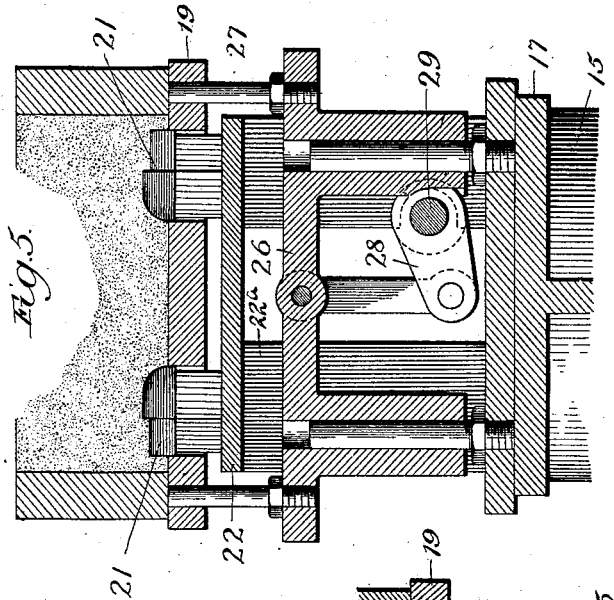
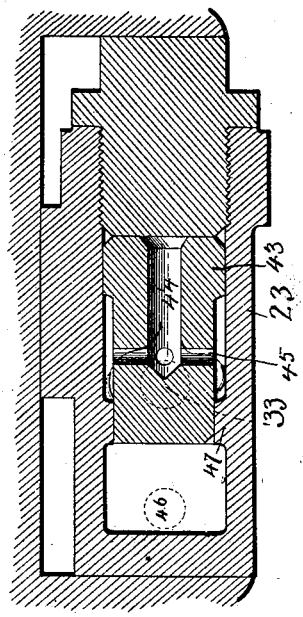
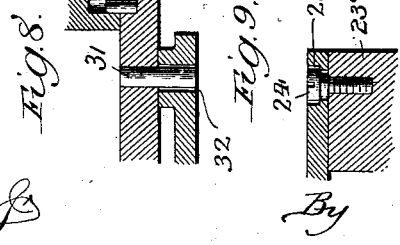
Witnesses:
Chas. F. Gaylord,
John Enders Jr.
Inventor:
William W. Doolittle
By Paul Synnestvedt
Attys.

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

MOLDING MACHINERY.

SPECIFICATION forming part of Letters Patent No. 718,829, dated January 20, 1903.

Application filed December 7, 1900. Serial No. 39,108. (No model.)

*To all whom it may concern:*

Be it known that I, WILLIAM W. DOOLITTLE, a citizen of the United States, residing in Chicago, Cook county, Illinois, have invented certain new and useful Improvements in Molding Machinery, of which the following, taken in connection with the accompanying drawings, is a specification.

The first of the objects of my invention is the provision of a molding-machine in which the pattern can be conveniently and efficiently vibrated or agitated, preferably by the use of automatic mechanism at the moment that the flask is lifted therefrom, in order to facilitate the separation of the pattern and sand and insure the formation of a perfect mold.

Another object of my invention is the construction of a molding-machine in which the pattern shall be so mounted within an apertured mold-support as to permit the same to be agitated or vibrated to facilitate the separation of the pattern from the sand, the said parts being constructed in such manner that while the pattern shall be movable with reference to the apertured mold-support and provided with suitable means for agitating or vibrating the same it shall at the same time be provided with devices to limit the extent of such vibration or agitation without permitting undue wear between the pattern and the apertured mold-support.

In carrying out my invention I preferably construct the pattern and apertured mold-support movable the one within the other to an amount sufficient to permit of the agitation above referred to, but at the same time not movable in the way in which the pattern is usually movable with reference to an apertured mold-support—that is, capable of being withdrawn or of having the stripping-plate elevated above the pattern, so as to separate the mold from the pattern. The reason that I prefer the construction which I have shown herein is that I have found considerable wear of the pattern to result from the movement of the same within a stripping-plate of the usual type, this wear, when it becomes appreciable, permitting the sand to enter between the pattern and stripping-plate and interfering with the relative movement between the two and the proper operation of the machine.

Another object of my invention is the combination, with a movable platen, of a novel means for counterbalancing said platen, comprising, primarily, an arm preferably pivoted at a point adjacent to the platen-frame and provided with a counterbalanced weight or equivalent device, the effective force of which by the construction employed by me varies substantially just in the proportion that the effective resistance to be overcome in moving the platen varies.

The above, as well as such other objects as may hereinafter appear, I obtain by means of a construction which I have illustrated in preferred form in the accompanying drawings, in which—

Figure 1 is a side elevation showing a molding-machine embodying my invention. Fig. 2 is a vertical section taken on the line 2 of Fig. 1 of the same, showing some of the parts in elevation. Fig. 3 is a plan view of the pattern and apertured mold-support, taken on line 3 of Fig. 1. Fig. 4 is a plan section taken on a line 4 4 of Fig. 2. Fig. 5 is a sectional elevation taken on the line 5 of Fig. 2 of a part of the machine designed to show the relation between the pattern-plate and the apertured mold-support. Fig. 6 shows the same sectional elevation as is shown in Fig. 5, but with the parts in different relative positions. Fig. 7 is a sectional view taken on the line 7 of Fig. 2, showing a portion of the machine with the means for agitating or vibrating the pattern shown in elevation. Fig. 8 illustrates a detail taken on the line 8 of Fig. 3 of the mechanism relating to the apertured mold-support and pattern-plate. Fig. 9 illustrates the connection between the pattern-plate and the upwardly-projecting brackets that form a portion of the frame of the machine, the view taken on the line 9 of Fig. 4. Fig. 10 is a sectional view taken on a vertical plane on the line 10 of Fig. 1, showing the internal construction of the automatic rapping device or pneumatic agitator which I prefer to employ in connection with my improvements.

In constructing a machine in accordance with my invention I provide, first, a frame consisting of a base part 11 and the upright standards 12, together with a fixed piston 13, with its rod 14, about which is a movable cylinder 15, which may be of any preferred construction. That which I have illustrated admits the fluid-pressure for actuating the compressing-cylinder through a passage 16 within the piston, and the pressure is arranged to be controlled by means of any suitable valve mechanism, many types of which are well known in this art. Extending upwardly from the top plate 17 of this cylinder are the supports 18, upon the upper ends of which rests an apertured mold-support 19, securely attached to the supports 18 by means of the bolts 20. Within the apertured mold-support is arranged a pattern 21, capable of a slight degree of lateral, or, more accurately, agitative, or rapping motion relative to the apertured mold-support and supported by a pattern-plate 22 below the apertured mold-support, the pattern projecting upwardly through the latter in a manner somewhat similar to the arrangement of the usual form of stripping-plate, but preferably constructed without any capacity for vertical movement relative to each other. The pattern-plate 22 is supported upon upwardly-projecting arms 23ª (see Fig. 9) and held in proper relative position by means of screw-bolts 24, the opening 25 through which such screw-bolt projects being of somewhat larger diameter than the exterior diameter of the bolt in order to permit a slight agitation or vibratory movement of the pattern-plate relative to the support 23ª.

Beneath the pattern-plate 22 is arranged a flask-lifting frame 26, provided with upwardly-projecting adjustable bolts 27, extending through the apertured mold-support, so as to raise the flask, as shown in Fig. 6, after the mold has been formed. The actuating means for this flask-lifting frame may be of any preferred construction; but I have shown a well-known arrangement comprising the rocking lever 28, the rocker-shaft 29, and the spring hand-lever 30.

The apertured mold-support is provided with four downwardly-projecting pins 31, (see Fig. 8,) arranged to pass through openings 32 in the pattern-plate, which are of slightly-larger diameter than the exterior diameter of the pins, but still sufficiently small to effectively limit the extent of the vibratory movement of the pattern-plate relative to the apertured mold-support. The extent of play provided between the patterns and the openings in the apertured mold-support through which the patterns project will in itself of course limit the amount of vibratory movement that may be imparted to the patterns and pattern-plate; but I prefer to save the patterns from all wear possible, and to this end introduce the pins 31, just referred to.

To the lower side of the pattern-plate 22 (see Fig. 7) I attach an automatic rapping device 23, preferably constructed to be operated by compressed air or other equivalent fluid-pressure, and the construction of this automatic rapping device employed by me I have shown in section in Fig. 10, although I desire it to be understood that any of the well-known forms of automatic impact mechanism could be employed for this purpose, if desired. The fluid-pressure for actuating the automatic rapping device is admitted through an inlet-pipe 33, (indicated on Fig. 2,) the pressure in the pipe 33 being controlled by any suitable valve mechanism, many forms of which are well known in the art.

The automatic mechanism shown in Fig. 10 is of the usual valveless type. The piston, which I have marked 43, is provided with an internal port 44, which connects with a transverse port or a series of transverse ports 45, through which air introduced by the inlet-pipe 33 reaches the right-hand end of the piston to force the same against the left-hand end of the cylinder when the ports 45 pass the partition 47, at which time the inlet from the supply-pipe 33 is cut off and the outlet through the dotted port 46 is opened to communication from the right-hand end of the piston-chamber through the ports 45, which allow the pressure that forced the piston over to exhaust, after which live-air pressure in the space between the large head of the piston and the smaller end serves to return the piston to the position shown in the drawings.

Upon the uprights 12 I have pivoted arms 34, constructed to engage the rods or side pieces 35, which carry the platen 36 from a pivoted center 37 at the base of the machine. The arms 34 are provided with weights or weighted ends 38, so arranged with relation to the arms that when the platen is in position over the flask the weights will not exert any force against the platen; but the rod 35 will bear against the stop 39, so as to check the forward movement of the platen exactly in the proper place. As the platen swings backward, as shown in Fig. 1, the arms 34 turn so as to raise the weight or weighted ends 38, and the effective force of the weights increases, as will be clearly evident from an examination of the drawings, the farther back the platen is moved, thus compensating for the increased force necessary to return the platen, due to its farther backward movement.

The term "apertured mold-support" which I have hereinabove used I intend to apply to the plate which supports the sand in the mold around the patterns, and I do not thereby intend to indicate what is known as an ordinary "stripping-plate," or, as it is sometimes called in the art, a "silhouette-plate"— that is, a plate which has a vertical or reciprocative movement relative to the pattern, whereby in forming the mold the plate supports the sand during the act of pulling the pattern from the mold. In my apparatus, as is clear from the drawings, there is no provision made for any relative reciprocative movement between the "sand-supporting or apertured mold support," as I have termed it, and the pattern, but only a capability of vibratory or rapping movement between the two, which is preferably and primarily on a horizontal plane—that is, which takes place laterally with reference to the vertical axis of the mold.

The operation of my invention is as follows: The flask having been put in position, as shown in Fig. 1, and filled with sand, the platen is brought over the flask and the mold compressed in the usual manner. After this operation, the exhaust of the fluid-pressure in the cylinder permits the latter to descend to the position shown in Fig. 2. The platen is now moved out of the way to the position shown in Fig. 1, air is admitted to the automatic rapping device, and while the same is agitating the pattern by the rapid vibration caused by its piston the lever 30 is sprung out of the notch with which it engages and lifted to the upper notch 40, (see Fig. 1,) which will raise the flask and separate the mold from the pattern, bringing the parts to the position shown in Fig. 6, the agitation or vibration of the pattern caused by the automatic rapping device insuring a perfect separation between the mold and the pattern.

Having thus described my invention, what I claim as new, and desire to secure by Letters Patent, is—

1. A molding-machine, comprising a plate for supporting the sand around the patterns having an opening corresponding to the pattern, a pattern capable of trembling or rapping movement within said opening, and mechanism for rapping said pattern, whereby to loosen the same from the mold, substantially as described.

2. A molding-machine having a sand-supporting plate containing an opening corresponding to a pattern, a pattern-plate, patterns mounted upon said pattern-plate, and supported thereby by means of projections extending through said first-mentioned plate, said patterns constructed so as to be capable of trembling or rapping movement relative to said plate, mechanism for agitating said pattern-plate and pattern, and means for separating the mold from the pattern during the operation of said agitating mechanism, substantially as described.

3. A molding-machine comprising a stationary apertured supporting-plate for the sand, a pattern capable of vibrating movement within said apertured sand-support, mechanism for agitating said pattern, and stop devices for limiting the extent of the vibratory motion between the pattern and the sand-support, substantially as described.

4. A molding-machine having an apertured sand-support, a pattern-plate, patterns mounted upon said pattern-plate and supported thereon by projections extending through the apertured sand-support, said patterns constructed so as to be capable of trembling or vibratory movement relatively to said sand-support, mechanism for agitating said pattern-plate and patterns, means for separating the mold from the pattern during the operation of the said agitating mechanism, and stop devices for limiting the vibratory movement of said pattern-plate relative to said sand-support, substantially as described.

5. A molding-machine comprising an apertured mold-support, a pattern capable of trembling or rapping movement within said apertured mold-support, mechanism for agitating said pattern, and pins for limiting the extent of the vibratory motion between the pattern and the apertured mold-support, substantially as described.

6. A molding-machine comprising a sand-supporting plate having an opening corresponding to the pattern, a pattern capable of trembling or rapping movement within said opening, mechanism for rapping said pattern, and means for separating said pattern and mold, so arranged that the pattern and the mold may be separated simultaneously with the operation of said rapping mechanism, substantially as described.

WILLIAM W. DOOLITTLE.

Witnesses:
PAUL SYNNESTVEDT,
PAUL CARPENTER.